(12) United States Patent
Endacott

(10) Patent No.: US 11,769,955 B1
(45) Date of Patent: Sep. 26, 2023

(54) LEAD FREE SOLDER SLEEVE CONNECTOR WITH THERMAL INDICATOR

(71) Applicant: John Endacott, Pensacola, FL (US)

(72) Inventor: John Endacott, Pensacola, FL (US)

(*) Notice: Subject to any disclaimer, the term of this patent is extended or adjusted under 35 U.S.C. 154(b) by 85 days.

(21) Appl. No.: 17/561,977

(22) Filed: Dec. 26, 2021

(51) Int. Cl.
*H01R 4/02* (2006.01)
*H01R 4/72* (2006.01)

(52) U.S. Cl.
CPC .............. *H01R 4/023* (2013.01); *H01R 4/021* (2013.01); *H01R 4/72* (2013.01)

(58) Field of Classification Search
CPC ........... H01R 4/023; H01R 4/021; H01R 4/72
See application file for complete search history.

(56) References Cited

U.S. PATENT DOCUMENTS

| | | |
|---|---|---|
| 4,563,224 A | 1/1986 | Gen et al. |
| 10,044,113 B2 | 8/2018 | Tardieu |
| 2020/0280156 A1* | 9/2020 | Forstmeier ............ B23K 20/16 |

* cited by examiner

*Primary Examiner* — Michael C Zarroli
(74) *Attorney, Agent, or Firm* — Peter Loffler

(57) ABSTRACT

A solder sleeve for connecting a wire to another wire or to a terminal device is formed from an alloy comprised of 42 percent tin and 58 percent bismuth that has a eutectic melt point of approximately 138° C. The wire receiving portion, at least one side of the solder sleeve is in the form of a hollow tubular member that is extruded so as to lack a longitudinal seam, the opposing side may be in one of many forms. A thermochromic dye is mixed in with a flux layer located on a portion of the outer surface of the solder sleeve, the dye designed to change from a first color to a second color at the same temperature as the melting point of the alloy. The solder sleeve may be held within a heat shrink tube.

20 Claims, 6 Drawing Sheets

LEAD FREE SOLDER SLEEVE CONNECTOR WITH THERMAL INDICATOR

BACKGROUND OF THE INVENTION

1. Field of the Invention

The present invention relates to a solder sleeve, including a crimp and solder sleeve for joining two wires or a single wire to a terminal connector, such as a ring terminal or a spade/fork terminal, wherein the solder sleeve is lead free and also has a thermal indicator that indicates when adequate reflow temperatures are reached or exceeded at the solder joint.

2. Background of the Prior Art

In order to connect a pair of wires (or more than two wires), or a wire and a terminal implement such as a ring terminal or a spade/fork terminal, a crimp connector or solder sleeve connector is often used. The wire or wires to be connected are inserted into a hollow cavity within the connector, the sleeve is optionally crimped in the crimp and solder version, and heat is applied to the sleeve in order to melt the sleeve about the wires being connected or the wire and the terminal. Once the sleeve becomes liquidous and then cools, a solid and strong electrical and mechanical connection is achieved. These types of connectors are found in both high temperature applications where the typical operating temperature is on the order to about 200° C. to about 240° C. and lower temperature applications where the continuous operating temperature is around 110° C. While effective, the low operating temperature lead-based solder sleeve connectors have become problematic over the past few years.

Lo temperature solder sleeve connectors are typically formed from an alloy that contains either lead, cadmium, or both in order to allow easy formation of the sleeve. In recent years various legislation has been passed that restricts the use of lead and cadmium, among such legislation is California Prop-65, the PA's Toxic Substance Control Act, the European's RoHS and REACH as well as China's RoHS, among others. These various pieces of legislation have sent designers scrambling for new connector solder sleeve alloys that do not employ lead or cadmium and that provide a connector sleeve that produces a strong electrical and mechanical connection between the part to be connected. Such design attempts have, at best, reached less than ideal results.

What is needed is a solder connector sleeve for use in low operating temperature environments (<125° C.) that does not employ lead or cadmium in its sleeve alloy. Such a solder sleeve connector must be able to provide a strong and solid electrical and mechanical connection between the parts being connected, even if the connector is being used by a person with limited experience in the use of such connectors.

SUMMARY OF THE INVENTION

The lead free solder sleeve connector with thermal indicator of the present invention addresses the aforementioned needs in the art by providing a low operating temperature connector for connecting two or more wires or one or more wires and a terminal implement, such as a ring terminal, a male/female quick disconnect, bullet plug/receptacle, or a spade/fork terminal, wherein the solder sleeve contains neither lead nor cadmium in its alloy formulation. The lead free solder sleeve connector with thermal indicator can be used in either a crimp or not crimp design and has a thermal indicator allowing a user to know when sufficient heat has been applied to the solder sleeve to achieve the proper electrical and mechanical connection. The lead free solder sleeve connector with thermal indicator of the present invention is comprised of a solder sleeve that has a first end in the form of a first hollow tubular member and a second end. The solder sleeve is formed of an alloy that is 42 percent tin and 58 percent bismuth and has a eutectic melt point at a set temperature, the temperature being 138° C. The first hollow tubular member receives a first stripped end of a first wire therein. A flux layer encompasses a portion of an outer surface of the solder sleeve. The flux layer has a thermochromic dye mixed therein, which dye changes from an initial color to a different final color whenever the solder sleeve is heated to the set temperature. The solder sleeve may be held within a heat shrink tube member. The first hollow tubular member is extruded so as to not have a longitudinal seam. The second end may be in the form of a second hollow tubular member that receives a stripped end of a second wire therein such that the second hollow tubular member is also extruded so that it lacks a longitudinal seam—the two ends may be extruded as a single unit. The second end may be in the form of a spade/fork terminal. The second end may be in the form of a male/female quick disconnect. The second end may be in the form of a bullet plug/receptacle. The second end may be in the form of a ring terminal.

BRIEF DESCRIPTION OF THE DRAWINGS

Similar reference numerals refer to similar parts throughout the several views of the drawings.

DESCRIPTION OF THE PREFERRED EMBODIMENT

Figure 1:
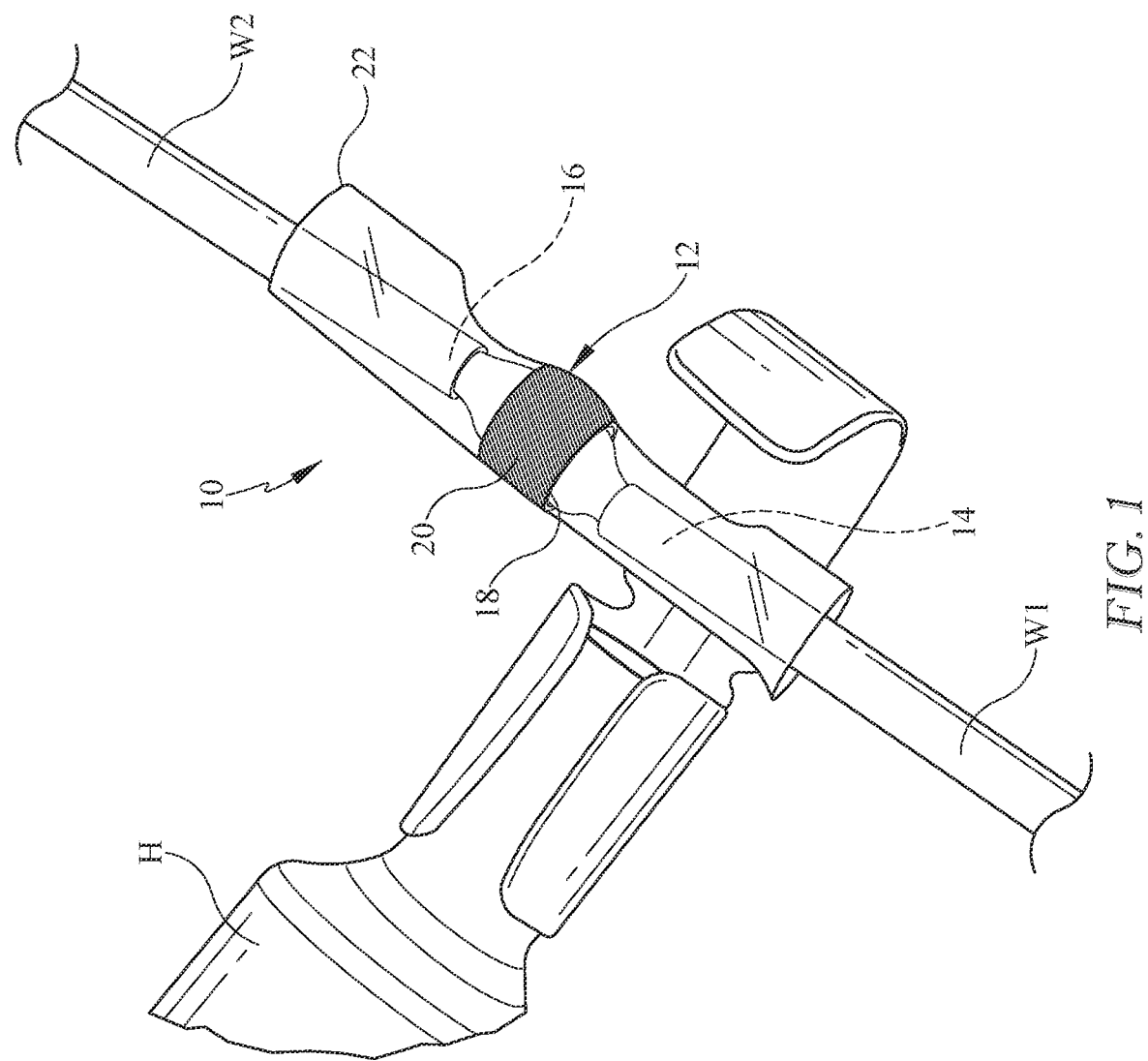
FIG. 1 is a perspective view of the lead free solder sleeve connector with thermal indicator of the present invention prior to the commencement of heat application onto the solder sleeve.
Figure 2:
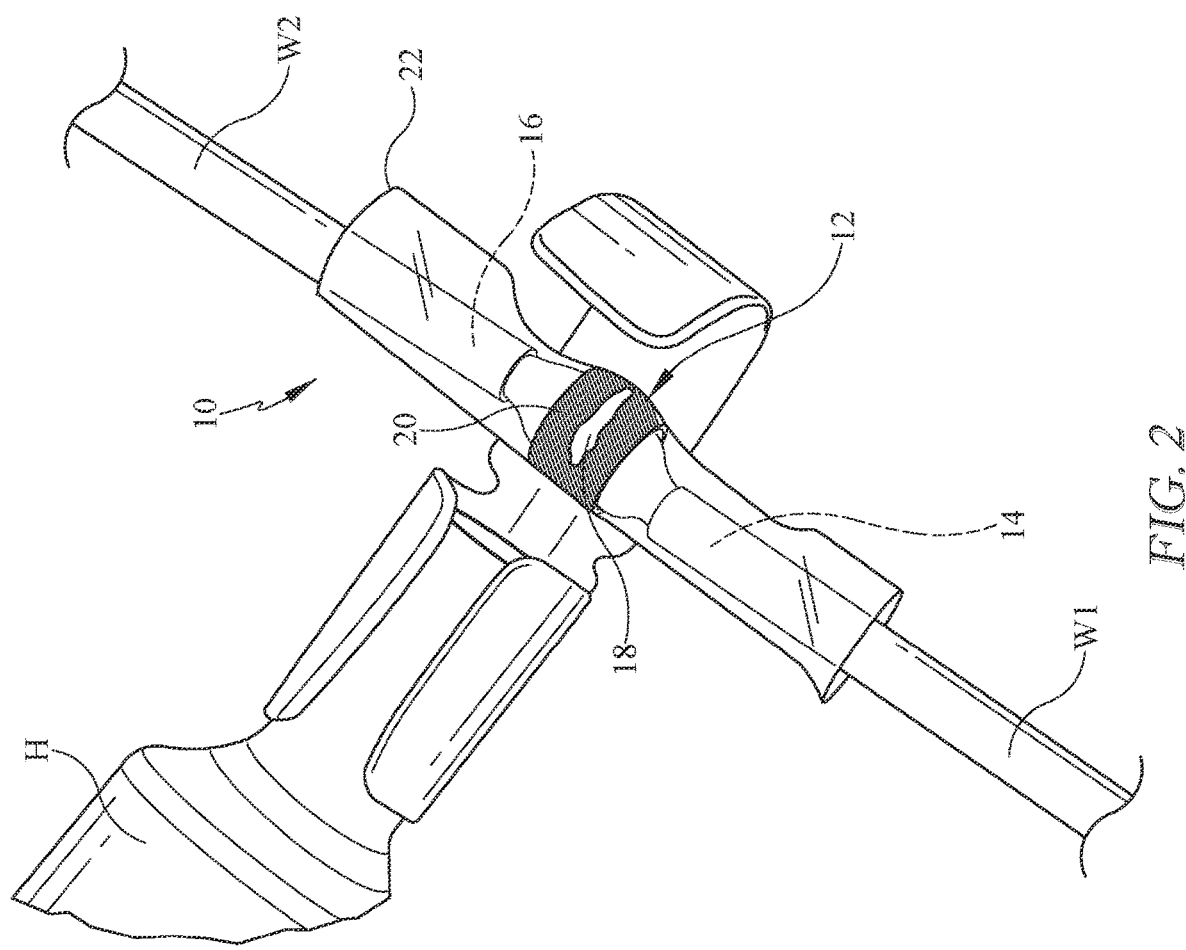
FIG. 2 is a perspective view of the lead free solder sleeve connector with thermal indicator at the initial stage of heat application onto the solder sleeve.
Figure 3:
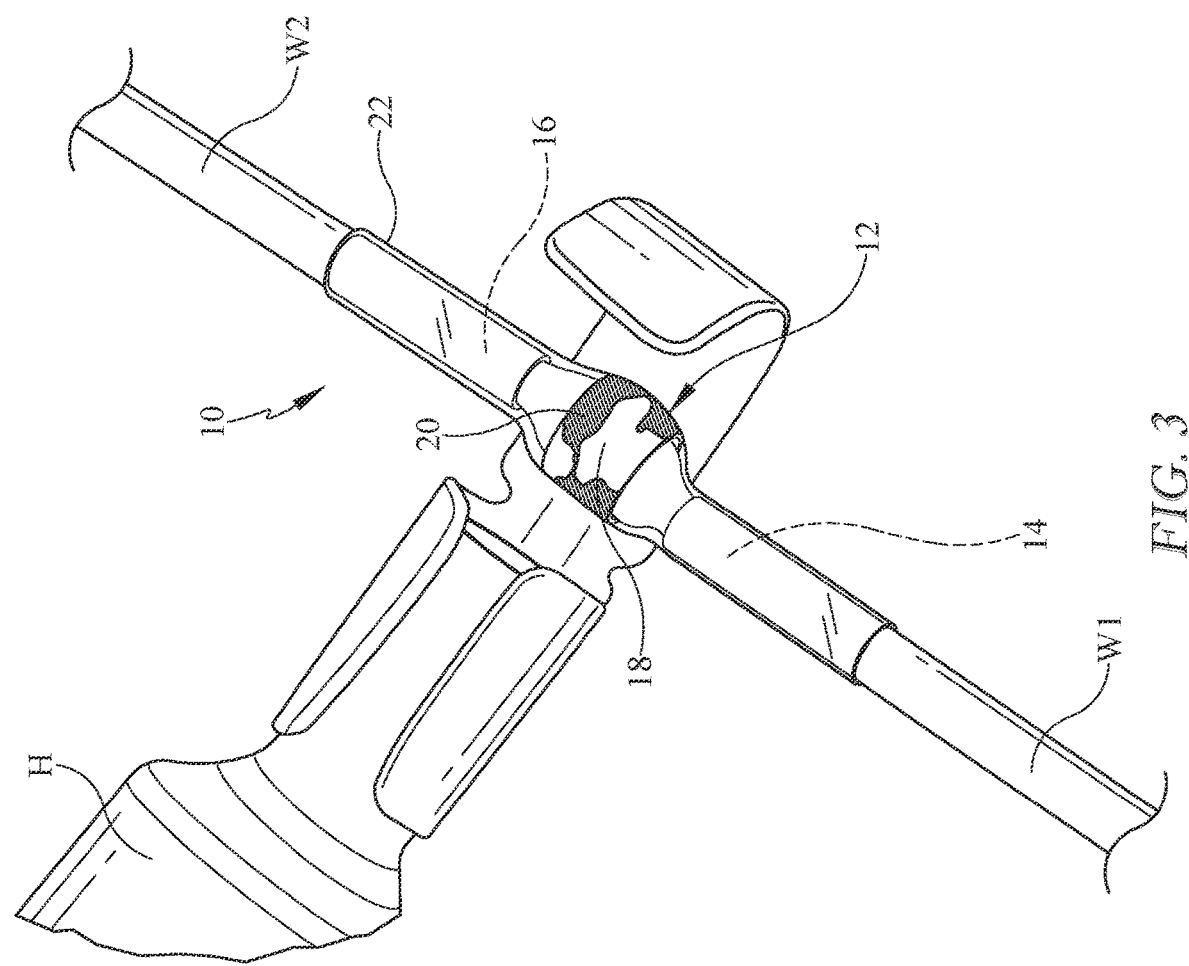
FIG. 3 is a perspective view of the lead free solder sleeve connector with thermal indicator at a latter stage of heat application onto the solder sleeve.
Figure 4:
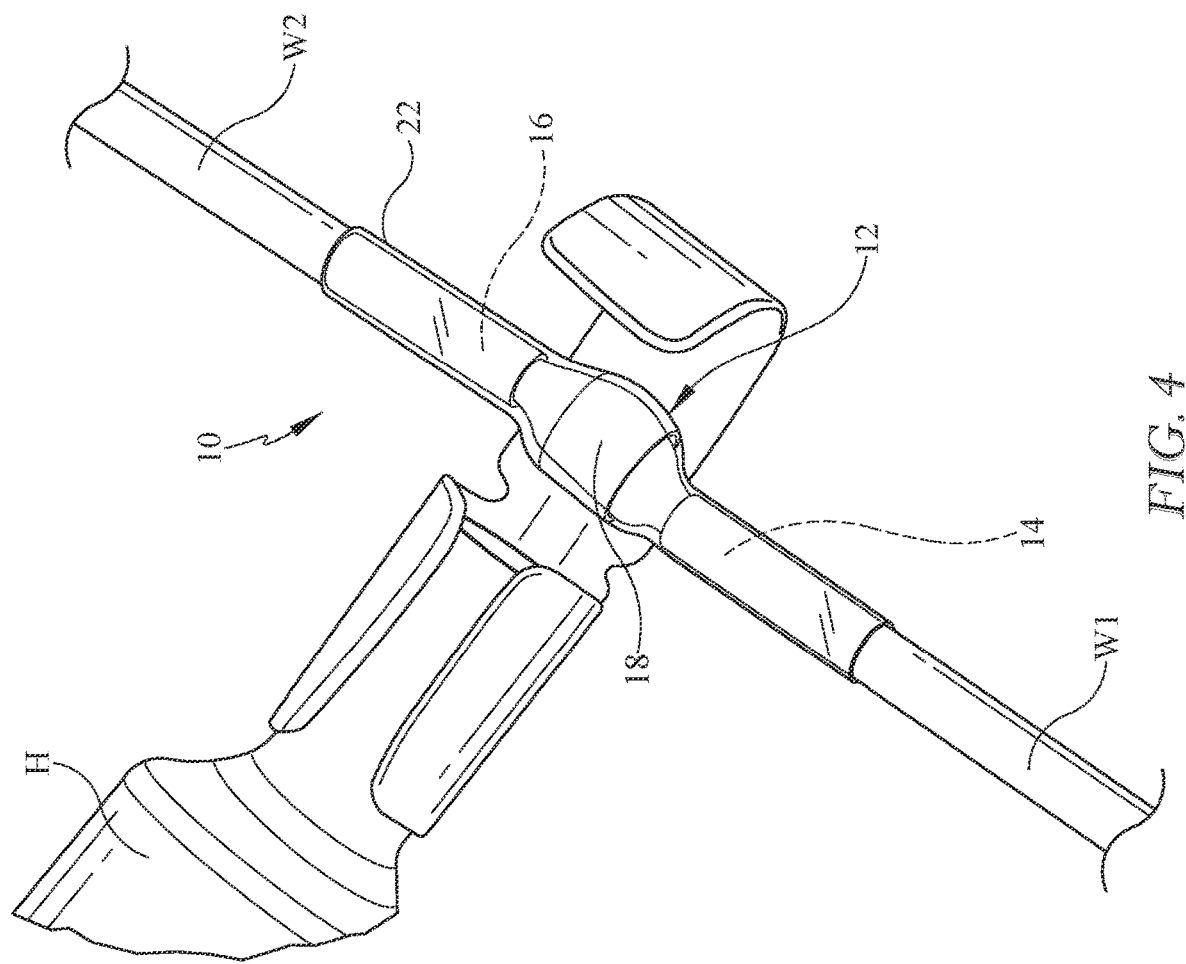
FIG. 4 is a perspective view of the lead free solder sleeve connector with thermal indicator at the conclusion of heat application onto the solder sleeve.
Figure 5:
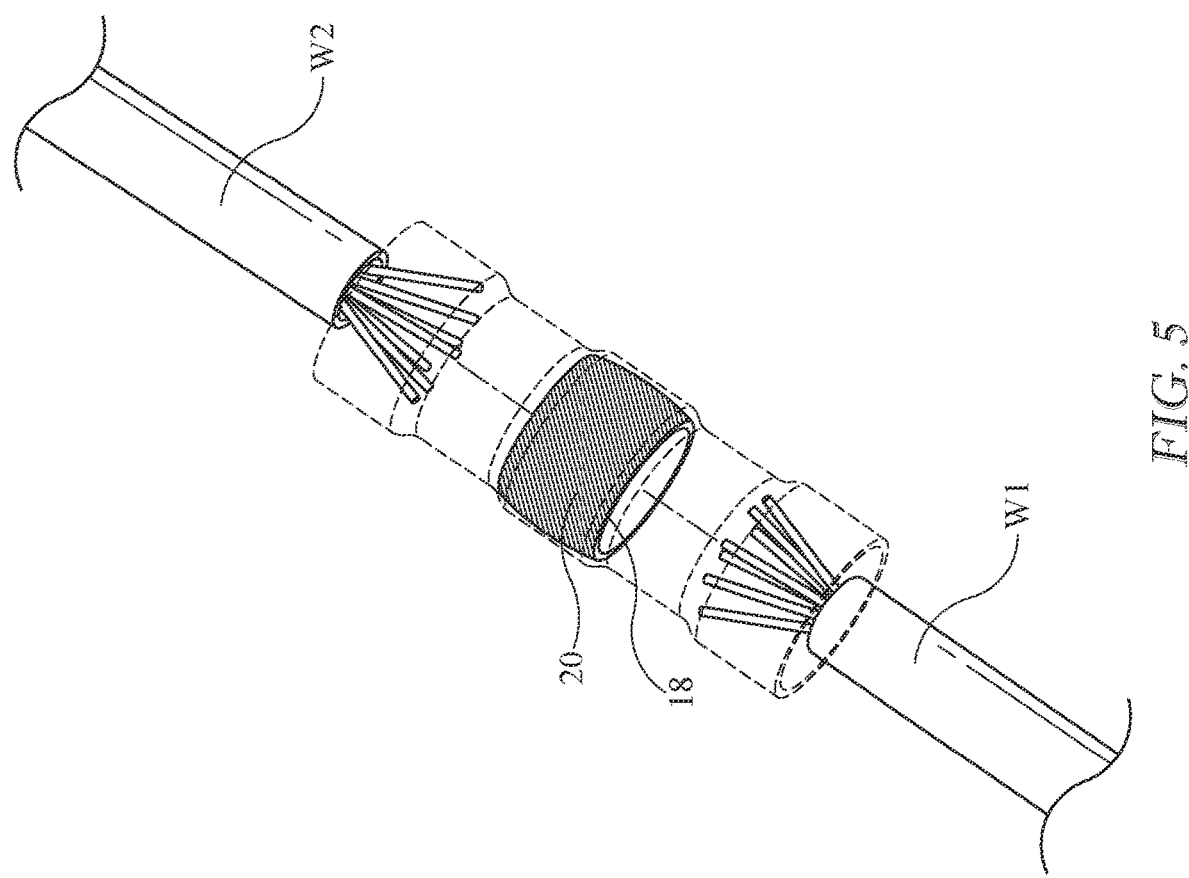
FIG. 5 is a perspective view of the lead free solder sleeve connector with thermal indicator having a pair of wires being introduced.

Referring now to the drawings, it is seen that the lead free solder sleeve connector with thermal indicator of the present invention, generally denoted by reference numeral 10, is comprised of a solder sleeve 12 that has a first end 14 and a second end 16 that serves as a connector end, which, as noted below, can take many forms. The first end 14 is a first hollow tubular member that is sized to snugly receive the stripped end of a first wire W1. In the particular embodiment illustrated in FIGS. 1-5, the second end 16 is a second hollow tubular member that is sized to receive the stripped end of a second wire W2. The first hollow tubular member and the second hollow tubular member, formed as a unitary item, are extruded so as to avoid the seam of a rolled solder sleeve as is typical in the art, the seam being a potential source of failure in rolled solder sleeves.

The solder sleeve 12 is formed from an alloy that is 42 percent tin and 58 percent bismuth (SN42BI58). Although this alloy is relatively brittle, it is, cast into a seamless sleeve. The SN42BI58 alloy has a eutectic melt point of about 138° C., more or less, making it an ideal candidate for as a low temperature connector.

As seen, a flux layer 18 encompasses a portion of the solder sleeve 12, which may be substantially all or even all of the flux layer 18 and has a thermochromic dye 20 mixed therein, the thermochromic dye 20 changing color when its temperature reaches the target 138° C., typically the color change is from a reddish color to the color clear.

The solder sleeve 12 may be held within a heat shrink tube 22 as is common in the art. The heat shrink tube 22 may be tinted in order to denote the sizing of the lead free solder sleeve connector with thermal indicator 10 or the heat shrink tube 22 may be clear with color markings to denote the size.

In order to use the lead free solder sleeve connector with thermal indicator 10, the appropriate size is selected for the gauge of wire(s) being connected. The first wire W1 is inserted into the first hollow tubular member and, if appropriate, the second wire W2 is inserted into the second hollow tubular member—if a crimp and solder connector with thermal indicator version is being used, in this embodiment, a window crimp barrel with an internal stop (not illustrated) may be present within the solder sleeve 12 to prevent the two wires W1 and W2 from meshing. In this embodiment, the first tubular member and the second tubular member are each crimped. Thereafter, heat is applied to the solder sleeve 12 via an appropriate heating unit H. Once the heat applied to the solder sleeve 12 causes the solder sleeve 12 to reach 138° C., the solder sleeve melts about the first wire W1 and the second wire W2. Coincidentally, the thermochromic die within the flux layer 18 changes from its initial color to its final color giving the user a visual indication that the solder sleeve 12 has been heated to the appropriate temperature and has become liquidous so that the user can discontinue the application of heat to the solder sleeve 12 as overheating can result in damage to the device. The heating also causes the heat shrink tube to shrink about the solder sleeve 12 and the wires W1 and W2 being connected. The two wires W1 and W2 are now lead free connected and form a solid electrical and mechanical connection with one another.

Figure 6:
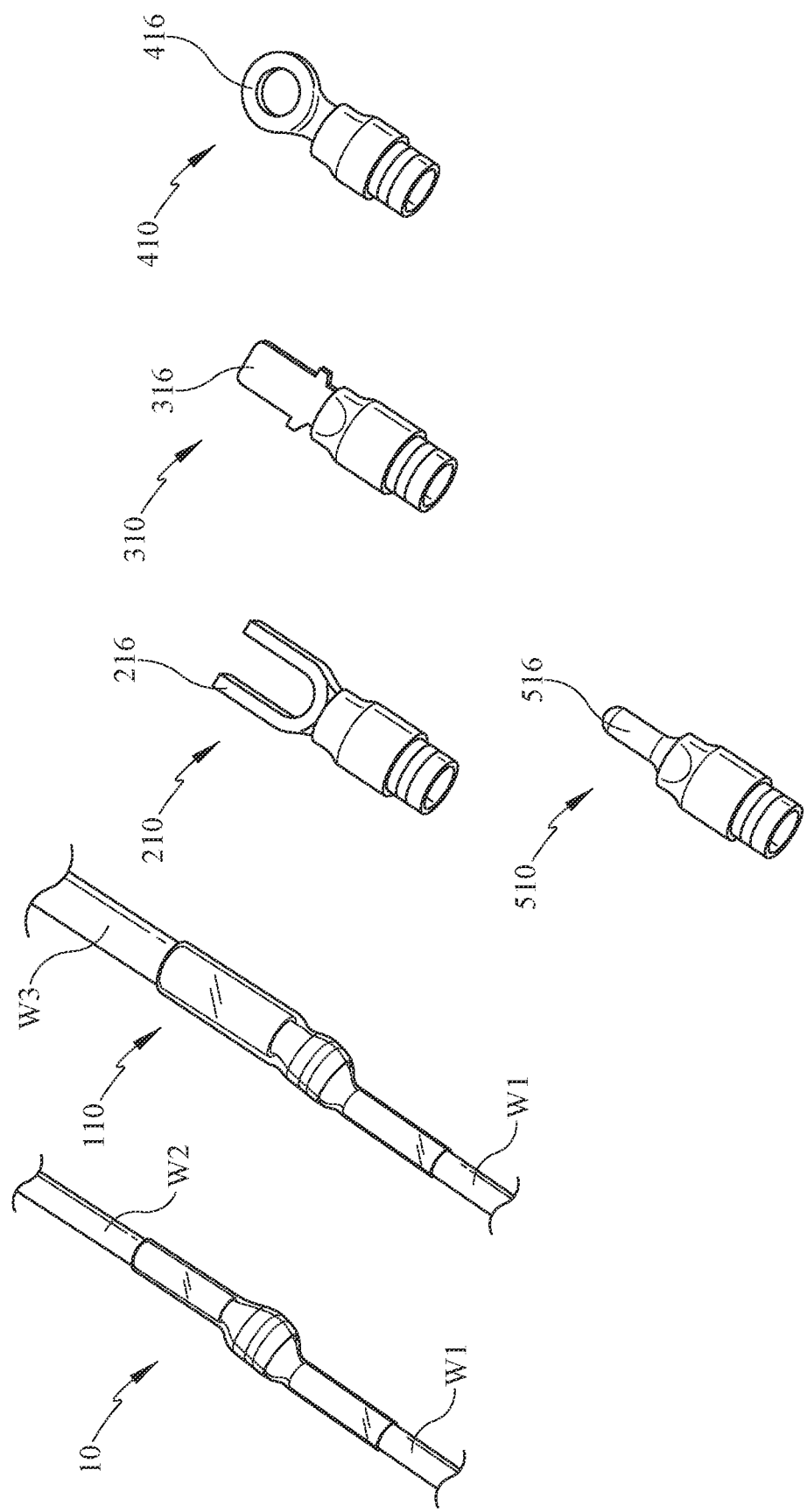
FIG. 6 is a perspective view of some of the various connectors that are usable with the lead free solder sleeve connector with thermal indicator.

As best seen in FIG. 6, the lead free solder sleeve connector with thermal indicator can come in many forms, including the standard two wire connection shown in FIGS. 1-4, a step-down wire connector 110, that wherein the first tubular member is of a different size relative to the second tubular member in order to connect two wires W1 and W3 of different gauges, a lead free solder sleeve connector with thermal indicator 210 for connecting a wire W1 to a spade/fork terminal 216, a lead free solder sleeve connector with thermal indicator 310 for connecting a wire W1 to a male/female quick disconnect 316, a lead free solder sleeve connector with thermal indicator 410 for connecting a wire W1 to a ring terminal 416, a lead free solder sleeve connector with thermal indicator 510 for connecting a wire W1 to a bullet plug/receptacle 516, etc.

While the invention has been particularly shown and described with reference to an embodiment thereof, it will be appreciated by those skilled in the art that various changes in form and detail may be made without departing from the spirit and scope of the invention.

I claim:

1. A solder sleeve connector comprising:
    a solder sleeve having a first end in the form of a first hollow tubular member and a second end, the solder sleeve comprised of an alloy that is 42 percent tin and 58 percent bismuth and that has a eutectic melt point at a set temperature, the first hollow tubular member adapted to receive a first stripped end of a first wire therein; and
    a flux layer encompassing a portion of the surface of the solder sleeve, the flux layer having a thermochromic dye mixed therein, the thermochromic dye set to change from an initial color to a different final color when an adequate reflow temperature is reached or exceeded at the solder sleeve.

2. The solder sleeve connector as in claim 1 wherein the set temperature is 138° C.

3. The solder sleeve connector as in claim 1 wherein the solder sleeve is held within a heat shrink tube member.

4. The solder sleeve connector wherein the first hollow tubular member is extruded thereby lacking a longitudinal seam.

5. The solder sleeve connector as in claim 1 herein the second end is in the form of a second hollow tubular member adapted to receive a stripped end of a second wire therein.

6. The solder sleeve connector as in claim 5 wherein the first hollow tubular member and the second hollow tubular member are each extruded so that each lack a longitudinal seam.

7. The solder sleeve connector as in claim 1 wherein the second end is in the form of a spade/fork terminal.

8. The solder sleeve connector as in claim 1 wherein the second end is in the form of a male/female quick disconnect.

9. The solder sleeve connector as in claim 1 wherein the second end is in the form of a bullet plug/receptacle.

10. The solder sleeve connector as in claim 1 wherein the second end is in the form of a ring terminal.

11. The solder sleeve as in claim 1 wherein the second end may be in the form selected from the group consisting of second hollow tubular member adapted to receive a stripped end of a second wire therein, a spade/fork terminal, a male/female quick disconnect, bullet plug/receptacle, and a ring terminal.

12. A solder sleeve connector comprising:
    a solder sleeve having a first end in the form of a hollow tubular member and a second end, the solder sleeve comprised of an alloy that is 42 percent tin and 58 percent bismuth and that has a eutectic melt point at a set temperature of 138° C., the hollow tubular member adapted to receive a first stripped end of a first wire therein and wherein the first hollow tubular member s extruded thereby lacking a longitudinal seam; and
    a flux layer encompassing a portion of the outer surface of the solder sleeve, the flux layer having a thermochromic dye mixed therein, the thermochromic dye set to change from an initial color to a different final color whenever an adequate reflow temperature is reached or exceeded at the solder sleeve.

13. The solder sleeve connector s in claim 12 wherein the solder sleeve is held within a heat shrink tube member.

14. The solder sleeve connector as in claim 12 wherein the second end is in the form of a second hollow tubular member adapted to receive a stripped end of a second wire therein.

15. The solder sleeve connector as in claim 14 wherein first hollow tubular member and the second hollow tubular member are each extruded so that each lack a longitudinal seam.

16. The solder sleeve connector as in claim 12 wherein the second end is in the form of a spade/fork terminal.

17. The solder sleeve connector as in claim 12 wherein the second end is in the form of a male/female quick disconnect.

18. The solder sleeve connector as in claim 12 wherein the second end is in the form of a bullet plug/receptacle.

19. The solder sleeve connector as in claim 12 wherein the second end is in the form of a ring terminal.

20. The solder sleeve as in claim 12 wherein the second end may be in the form selected from the group consisting of second hollow tubular member adapted to receive a stripped end of a second wire therein, a spade/fork terminal, a male/female quick disconnect, a bullet plug/receptacle, and a ring terminal.

* * * * *